United States Patent Office 2,950,238
Patented Aug. 23, 1960

2,950,238

SILICON CARBIDE BODIES FOR USE IN NUCLEAR REACTORS

Kenneth C. Nicholson, Niagara Falls, N.Y., assignor, by mesne assignments, to the United States of America as represented by the United States Atomic Energy Commission No Drawing. Filed Sept. 29, 1955, Ser. No. 537,578

7 Claims. (Cl. 204—193.2)

This invention relates to the manufacture of silicon carbide bodies for use in nuclear reactors. More particularly, it pertains to dense silicon carbide bodies or articles composed essentially of silicon carbide and containing a nuclear fuel component within the body of the article so that the composite body is useful as a nuclear fuel element.

Ever since the availability of silicon carbide as an industrial material, attempts have been made to mold or form it into bodies or shapes of extremely high density consisting substantially entirely of silicon carbide. Since silicon carbide does not soften under the application of heat and/or pressure the usual methods of obtaining high density such as by hot pressing have not been especially effective on a commercial basis in making articles from silicon carbide. Furthermore, it is extremely difficult, and in many instances impossible, to make certain shapes such as long slender tube forms, or other intricately formed articles by hot pressing procedures. Other attempts at making high density silicon carbide articles have also been made without success. For example, attempts have been made to make dense silicon carbide bodies by embedding molded shapes of silicon carbide in a conventional silicon carbide furnace within the mixture of coke and sand in the hope that the embedding mixture would be caused to vaporize and penetrate the silicon carbide structure and form additional silicon carbide within the pores. These efforts have never proved to be practical from the standpoint of obtaining acceptable results. Another method which never proved to be commercially successful or satisfactory has been the molding of bodies from a mixture of silicon carbide and carbon and subsequently firing them in the presence of silicon to convert the carbon contained within the body to silicon carbide. Regardless of the specific method employed, there has long been a need for a practical process for making extremely dense silicon carbide bodies consisting substantially entirely of silicon carbide.

There are disclosed herein methods for making such dense bodies composed essentially of silicon carbide.

More recently developments in the field of nuclear reactors have created a demand for cheaper and better nuclear fuel elements. Many of the inherent properties of silicon carbide, including its high refractoriness, resistance to corrosion and erosion, inertness to other materials, and particularly its low thermal neutron absorption cross-section, have suggested its possible application in the construction of nuclear fuel elements. However, it is also desirable that the fuel element body be of the greatest possible density and impermeability to increase its resistance to oxidation and improve its strength at high temperatures.

It is therefore an object of the present invention to provide a dense silicon carbide body containing nuclear fuel materials for use in nuclear reactors.

I have discovered that dense silicon carbide articles composed substantially entirely of silicon carbide and having a very high density comparable to the density heretofore considered to be obtainable only by hot pressing can be made in which are incorporated a small amount of a thermal neutron generating material, such as the necessary amounts of nuclear fuel constituents to render the body useful as a nuclear fuel element. The nuclear fuel component of the silicon carbide body can be incorporated within the body, either as an occluded or segregated mass or core of material in the center of the body shielded by the surrounding mass of dense silicon carbide or it can be dispersed throughout the silicon carbide material. The nuclear fuel constituent can be introduced into the silicon carbide body in the elemental form, such as uranium, or plutonium metals, or it can be introduced in the form of the oxide, carbide, salt or other compound form. For example, uranium can be incorporated as the oxide $UO_2$.

The silicon carbide bodies can be made by forming a bonded or recrystallized porous silicon carbide body structure of the desired shape, subsequently impregnating the pores of the body with a carbonizable material and carbonizing the same or otherwise loading the pores of the porous body with deposited carbon, and then heating the carbon-impregnated body in the presence of silicon to cause the silicon to penetrate and react with the carbon within the pores of the body to form additional silicon carbide. The body is preferably held at an elevated temperature around 2100–2300° C. for a sufficient period of time to cause the silicon carbide thus formed to develop into the hexagonal crystalline habit. If desired, any small amount of residual free silicon which may be found in the pores of the article other than that which may be trapped or occluded in certain internal closed pores can be removed by leaching the resulting body with a mixture of hydrofluoric and nitric acids or by holding the article at sufficiently high temperature to volatilize most of the residual silicon. Although one such impregnation has usually been found to provide an article of sufficiently high density for most purposes, the entire impregnating procedure can be repeated if necessary to further increase the density of the finished body.

The porous silicon carbide body structure which is to be used as the base body structure of the article can be formed by any one of the conventional molding or forming procedures using any desired grit size or combination of grit sizes of silicon carbide in admixture with the desired amount of nuclear fuel material, such as uranium oxide, together with a small amount of a temporary binder. Alternatively, the granular silicon carbide material can be admixed independently of the nuclear fuel material, the latter being placed within the mold cavity in a separate step so as to be surrounded by the silicon carbide mix, and subsequently pressed to mold the silicon carbide around the nuclear fuel component. The present process does not require the use of any specific grade or variety of silicon carbide although it is preferred to use a silicon carbide of relatively high purity such as that known in the trade as "green" grade of silicon carbide. The raw mixture of silicon carbide, nuclear fuel component and temporary binder is pressed at high pressures, extruded or otherwise suitably molded to the desired shape, dried and fired to remove the temporary binder and form a bonded or recrystallized porous silicon carbide body structure of the desired shape containing the nuclear fuel component throughout the body, or molded as a core about the nuclear fuel component as explained above. For example, very satisfactory porous silicon carbide body structures suitable for use in practice of the present invention are obtained by cold pressing, followed by drying and firing at about 2300° C. to drive off the temporary binder and recrystallize the silicon carbide. Such bodies may have a porosity in the neighborhood of 25–30%. While firing at around 2300° C. results in a porous body in which the silicon carbide is held together by recrystallization it is not essential that recrystallizing temperatures be employed to form the porous silicon carbide body structure. The molded shape can be bonded into a porous structure and fired at lower temperatures below those at which recrystallization takes place and the resulting bonded shape satisfactorily used in making articles in accordance with the present invention.

Porous silicon carbide body structures for practicing the present invention can also be made by forming the initial porous body from a mixture of silicon carbide, nuclear fuel component and elemental silicon and firing the molded article in a carbonaceous atmosphere at a temperature around 1350° C. to convert the silicon to silicon carbide. The resulting porous bonded silicon carbide shape is then impregnated with carbon and siliconized as will be hereinafter described.

As an alternative to mixing the nuclear fuel material with the granular silicon carbide mixture from which the body is made, or compacting the silicon carbide mixture in a mold about a centralized core of the nuclear fuel material, the nuclear fuel material can be introduced into the silicon carbide body by first forming and firing the body and subsequently impregnating the porous silicon carbide body with the nuclear fuel material in the form of a solution or dispersion. For example, the porous silicon carbide body can be impregnated with a uranium salt solution and dried to deposit uranium material within the structure.

While my preferred practice is to fire the molded silicon carbide shape containing the nuclear fuel material prior to loading the pores with carbon because of the advantages of greater handling strength and clearance of volatile parts of any temporary binder from the pores making impregnation of the pore structure that much easier, it is possible to introduce carbon into the body of the article prior to the initial firing step.

The second step of the present process, having obtained a porous body structure consisting substantially entirely of silicon carbide and nuclear fuel material, is the loading of the pores of the porous silicon carbide body structure with carbon. This is usually done by charging the body with a carbonizable organic material which is then chemically or thermally carbonized to provide a filling of carbon within the pores of the silicon carbide structure. One very satisfactory method of loading the pores of the porous silicon carbide body with carbon is to fill the pores the body with a furfuryl compound such as furfural and/or furfuryl alcohol and then expose the treated body to hydrochloric acid or other mineral acid vapors to precipitate carbon within the body by chemical carbonization of the furfuryl compound. Another method of introducing a carbonizable material into the porous silicon carbide body structure is to treat the porous body with an organic resinous compound such as a liquid phenol-formaldehyde resinous condensation product and then heat the treated body to thermally decompose and carbonize the resinous material and thus load the pores with carbon. Still a third method of depositing carbon in the pores of the body is by heating the body in a carbonaceous gas such as methane or acetylene at a temperature at which the gas will break down and deposit carbon within the pores. Deposition of the desired amount of interstitial carbon can be accomplished in one or more treatments of the porous body prior to the later siliconizing step. Optimum results in respect of high density of the final product are obtained when sufficient carbon is introduced into the pores that upon subsequent heating in the presence of silicon the silicon carbide formed within the pores of the body structure substantially fills the interstitial space. In other words, the carbon prior to siliconizing should not fill the pores of the original silicon carbide body to the extent that the silicon cannot penetrate the body during the siliconizing step.

The third step of the present process is the conversion of the interstitial carbon deposited in the porous silicon carbide body structure to additional silicon carbide. This is accomplished by heating the impregnated shape at an elevated temperature of about 2000° C. in the presence of elemental silicon, or a source of elemental silicon such as silicon nitride which will dissociate to provide elemental silicon, whereupon the silicon will penetrate the body and react with the carbon within the pores of the body to form silicon carbide. While this penetration and reaction can be caused to take place in a relatively short time in which case the thus formed silicon carbide developed within the pores of the article is of the cubic crystalline habit, best results in the obtaining of articles of extremely high density are obtained by holding the article at an elevated temperature around 2100–2300° C. for a sufficient length of time to cause the interstitial silicon carbide after it is formed to convert to silicon carbide of the hexagonal crystalline habit. Holding the article at sustained high temperatures also aids further recrystallization and better bonding of the newly formed silicon carbide with the original silicon carbide of the body structure. If the resulting article does not have a sufficiently high density following the initial siliconizing operation, the impregnating procedure can be repeated to further increase the density.

The following specific examples serve to further illustrate the exact manner in which the present invention is practiced.

*Example I*

The following mixture and procedure have been used in making dense silicon carbide bodies containing nuclear fuel material and suitable for use in a nuclear reactor.

| | Parts by weight |
|---|---|
| Silicon carbide, 100 grit mesh size | 55 |
| Silicon carbide, 220 grit mesh size | 15 |
| Silicon carbide, 3F grit mesh size | 15 |
| Silicon carbide, 1000 grit mesh size | 15 |
| Phenolic resin temporary binder | 2 |
| Pine oil | 5 |

The above mixture is admixed with uranium oxide in the proportions of 2.44 parts by weight of uranium oxide to 97.56 parts by weight of the above silicon carbide mixture. The resulting silicon carbide-uranium oxide mixture is cold pressed at 5000–10,000 pounds per square inch to form a small disc shaped body approximately ½" in diameter and a thickness of approximately ³⁄₁₆". The molded body is oven-dried to remove the volatiles of the temporary binder and fired at a temperature of 2300° C. in an argon atmosphere in a high-frequency furnace to drive off the residual volatile temporary binder and recrystallize the silicon carbide. The resulting porous recrystallized silicon carbide shape containing the nuclear fuel material has a porosity of from 25–30%.

It is preferred to maintain a slight pressure on the disc during the recrystallization, for example by heating it while held between smooth plates of graphite.

The resulting porous silicon carbide body structure is then soaked in furfural or furfuryl alcohol and the saturated body exposed to hydrogen chloride vapors to carbonize the furfural or furfuryl alcohol, after which the article is oven-dried to remove any residual volatile matter. Impregnation with furfuryl compound and carbonization can be repeated until the required amount of carbon is deposited in the pore structure.

The thus prepared body is then heated to about 2100–2300° C. in a graphite crucible in an induction furnace in the presence of silicon which penetrates the pores of the porous body and reacts with the carbon contained therein to form additional silicon carbide in the pores of the porous silicon carbide body structure. The article is held at 2300° C. or above for approximately ½ hour to allow time for the silicon carbide formed within the pores of the article to convert to silicon carbide of the hexagonal crystalline form.

Small silicon carbide shapes made in accordance with the above procedure are composed substantially entirely of silicon carbide which is self bonded by recrystallization and the nuclear fuel material, together with a small amount of residual silicon usually not amounting to more than 5%. When the initial shape has been made by pressing, the final product has a density of as high as 3.00 and even as high as 3.15. When the initial shape has been made by extrusion, the final product has a density around 2.85.

*Example II*

Using the same silicon carbide mixture used in Example I, small disc shaped bodies approximately ½" diameter and 3/16" thick composed of dense silicon carbide and containing a nuclear fuel material are made as follows: 0.85 gram of the silicon carbide mixture is placed within a mold barrel of ½" inside diameter and hand pressed to compact the mixture. A small centrally positioned cavity is formed in the compacted mass of material and 0.04 gram of uranium oxide, $UO_2$, placed in the thus formed cavity, and an additional 0.75 gram of the silicon carbide mixture placed in the mold barrel over the uranium oxide and initially compacted mass of silicon carbide mix. The entire mold contents is then pressed at 5000 pounds per square inch. The molded body is oven-dried at 220° F. to remove the volatiles of the temporary binder and fired at a temperature of 2200° C. in an atmosphere of argon, maximum temperature being held for ½ hour in a high frequency furnace, to drive off the residual volatile temporary binder and recrystallize the silicon carbide.

The resulting porous silicon carbide body is impregnated with carbon and siliconized to densify the body in accordance with the procedure set forth under Example I.

*Example III*

Using the same mix used in Example II and forming a recrystallized silicon carbide containing a nuclear fuel material by cold pressing and recrystallization in the same manner therein described, the resulting porous recrystallized silicon carbide body containing a nuclear fuel material is charged with carbon by impregnating the body with a liquid phenol-formaldehyde condensation product resin. The impregnated body is fired to a temperature of 800° C. to carbonize the resin and deposit carbon within the pores of the body. The resulting carbon-loaded silicon carbide-nuclear fuel material body structure is then heated in the presence of silicon and further processed in accordance with the procedure set forth in Example I above. The resulting shape has the same physical characteristics of high density and impermeability shown for the articles made in accordance with Example I wherein the carbon loading is accomplished by chemical carbonization of furfural by mineral acid fumes.

Having described the present invention in detail, it is desired to claim:

1. A method of making a nuclear fuel element having a density of about 3 grams per cubic centimeter which comprises providing a porous body consisting essentially of silicon carbide and containing a thermal neutron fissionable material, impregnating said body with a sufficient amount of carbon to react with silicon to form enough silicon carbide to substantially fill the pores of the body, heating the carbon-charged body in the presence of silicon to a temperature of 2100–2300° C. to cause the silicon to penetrate the body and react with the carbon in the pores to form silicon carbide, and holding the body at said high temperature a sufficient length of time to convert the silicon carbide formed within the pores of the article to silicon carbide of the hexagonal crystal form.

2. A method of making a nuclear fuel element having a density of about 3 grams per cubic centimeter which comprises forming a body of the desired shape composed of silicon carbide and a thermal neutron fissionable material, firing said body to bond the silicon carbide together and provide a porous silicon carbide body of the desired shape containing thermal neutron fissionable material, charging the pores of said body with a sufficient amount of carbon to react with silicon to form enough silicon carbide to substantially fill the pores of the body, heating the carbon-charged body in the presence of silicon to a temperature of 2100–2300° C. to cause the silicon to penetrate the body and react with the carbon in the pores to form silicon carbide, and holding the body at said high temperature a sufficient length of time to convert the silicon carbide formed within the pores of the article to silicon carbide of the hexagonal crystal form.

3. A method of making a nuclear fuel element having a density of about 3 grams per cubic centimeter which comprises forming a body of the desired shape about a core of thermal neutron fissionable material, firing said body to bond the silicon carbide together and provide a porous silicon carbide body of the desired shape containing a core of thermal neutron fissionable material, charging the pores of said body with a sufficient amount of carbon to react with silicon to form enough silicon carbide to substantially fill the pores of the body, heating the carbon-charged body in the presence of silicon to a temperature of 2100–2300° C. to cause the silicon to penetrate the body and react with the carbon in the pores to form silicon carbide, and holding the body at said high temperature a sufficient length of time to convert the silicon carbide formed within the pores of the article to silicon carbide of the hexagonal crystal form.

4. A method of making dense silicon carbide articles of manufacture containing a thermal neutron fissionable material and having a density of about 3 grams per cubic centimeter which comprises forming a body from a mixture of granular silicon carbide and a thermal neutron fissionable material, firing said body to form a porous silicon carbide body containing said thermal neutron fissionable material, impregnating said body with a sufficient amount of carbon to react with silicon to form enough silicon carbide to substantially fill the pores of the body, heating the carbon-charged body in the presence of silicon to a temperature of 2100–2300° C. to cause the silicon to penetrate the body and react with the carbon in the pores to form silicon carbide, and holding the body at said high temperature a sufficient length of time to convert the silicon carbide formed within the pores of the article to silicon carbide of the hexagonal crystal form.

5. A method of making dense silicon carbide articles of manufacture containing thermal neutron fissionable material and having a density of about 3 grams per cubic centimeter which comprises forming a body composed substantially entirely of silicon carbide, firing said body to recrystallize the silicon carbide and provide a porous recrystallized silicon carbide body, impregnating said body with a thermal neutron fissionable material in solution and drying said body, impregnating said body containing the thermal neutron fissionable material with a sufficient amount of carbon to react with silicon to form enough silicon carbide to substantially fill the pores of the body, heating the carbon-charged body in the presence of silicon to a temperature of 2100–2300° C. to cause the silicon to penetrate the body and react with the carbon in the pores to form silicon carbide, and holding the body at said high temperature a sufficient length of time to convert the silicon carbide formed within the pores of the article to silicon carbide of the hexagonal crystal form.

6. A nuclear fuel element consisting essentially of a dense silicon carbide body containing a minor amount of a thermal neutron fissionable material, said element having been made according to the process of claim 1.

7. A nuclear fuel element comprising a mass of thermal neutron fissionable material encased in a surrounding mass of dense silicon carbide, said element having been made according to the process of claim 3.

References Cited in the file of this patent

UNITED STATES PATENTS 2,431,326     Heyroth _____ Nov. 25, 1947

FOREIGN PATENTS 707,065     Great Britain _____ Apr. 14, 1954

OTHER REFERENCES

Goodman: The Science and Engineering of Nuclear Power, Addison-Wesley Press, Inc. (1947), page 302.

U.S. Atomic Energy Commission, BMI-748, by E. G. Jarman et al., June 3, 1952. Library received publication Sept. 8, 1952. Available from AEC Technical Information Service, Oak Ridge, Tenn. (pages 13 and 32).